Feb. 7, 1950     C. E. LARSON     2,497,003
AMUSEMENT DEVICE
Filed Nov. 13, 1944     3 Sheets-Sheet 1
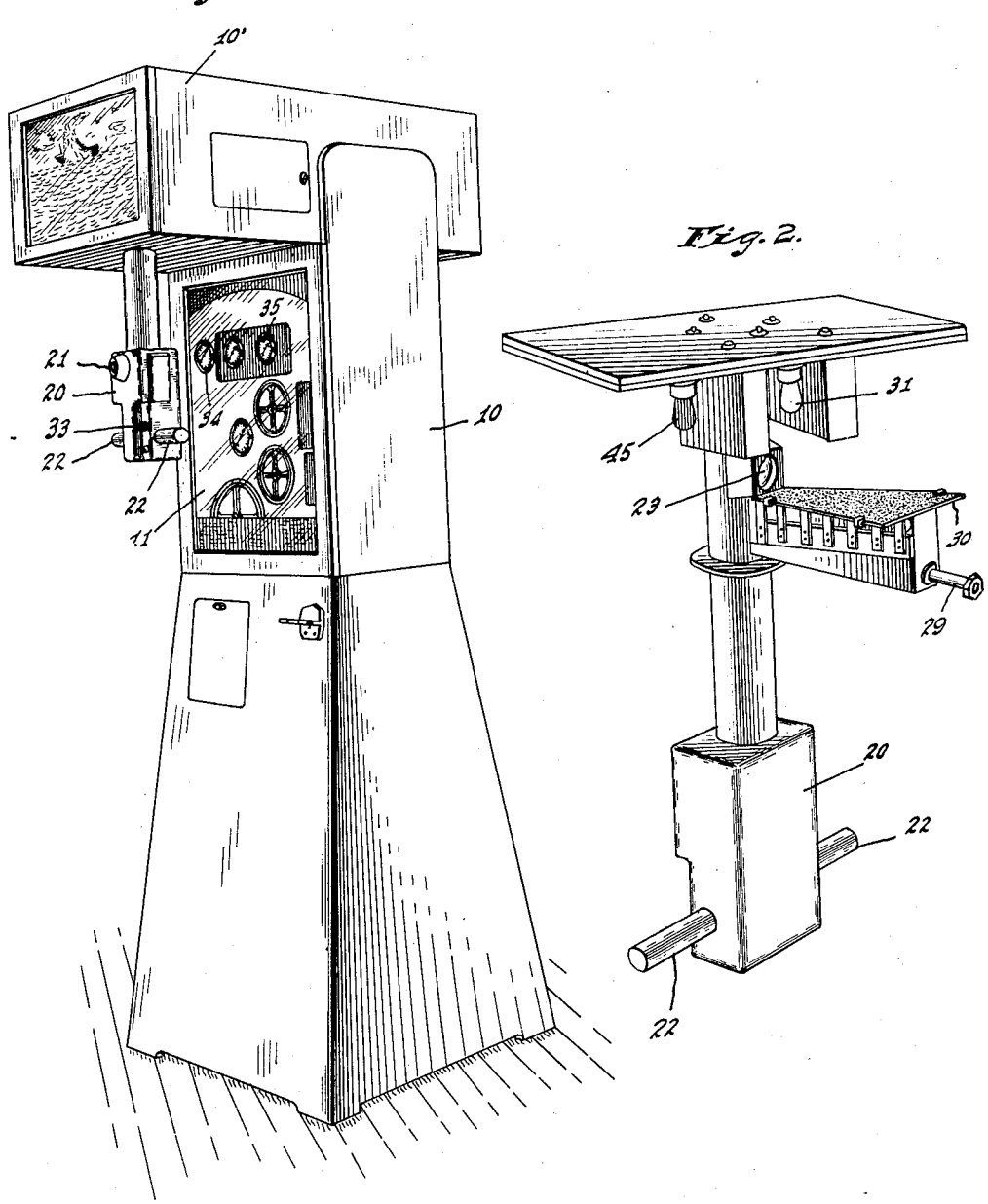
INVENTOR.
CARL ELMER LARSON,
BY Hood & Hahn
ATTORNEYS.

Feb. 7, 1950　　　　C. E. LARSON　　　　2,497,003
AMUSEMENT DEVICE
Filed Nov. 13, 1944　　　　3 Sheets-Sheet 2
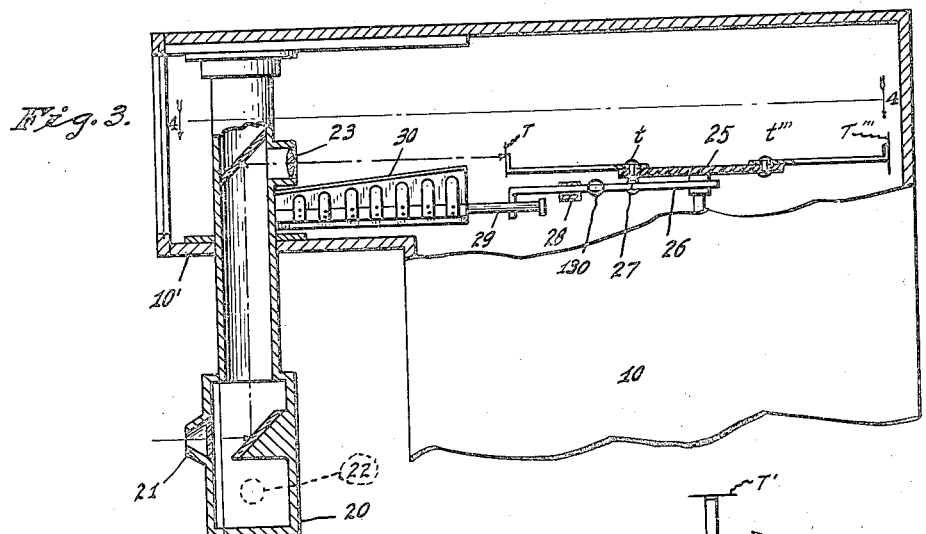
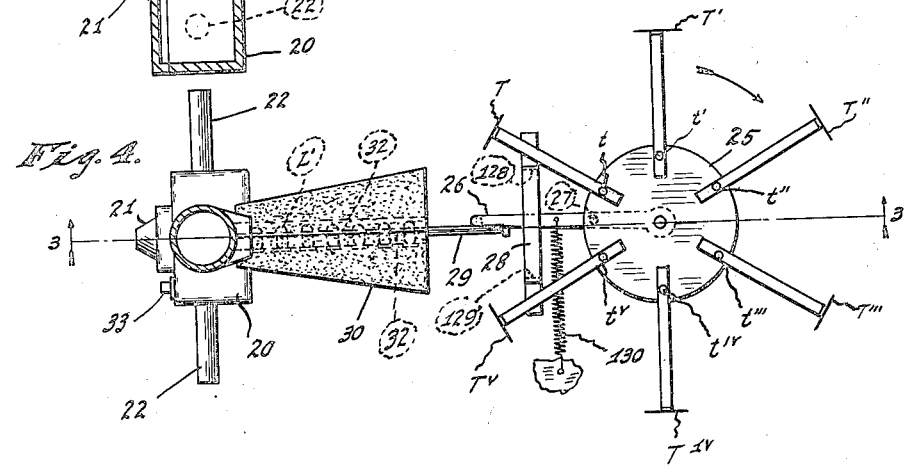
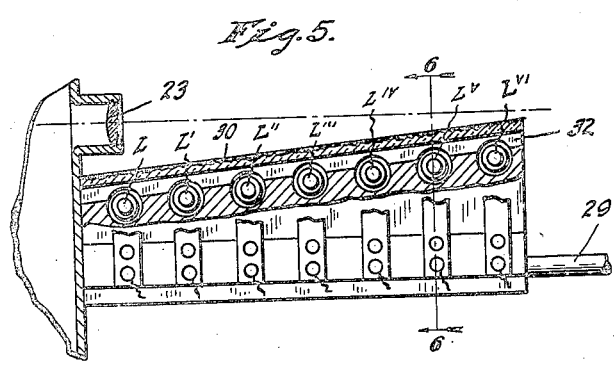
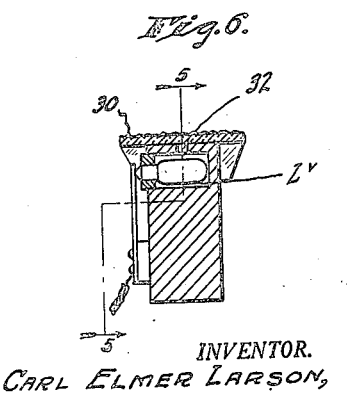
INVENTOR.
CARL ELMER LARSON,
BY
Hood & Hahn
ATTORNEYS.

INVENTOR.
CARL ELMER LARSON,
BY Hood & Hahn
ATTORNEYS.

Patented Feb. 7, 1950

2,497,003

UNITED STATES PATENT OFFICE 2,497,003

AMUSEMENT DEVICE

Carl Elmer Larson, Indianapolis, Ind., assignor to Eva M. Larson, Chicago, Ill., as trustee Application November 13, 1944, Serial No. 563,188

6 Claims. (Cl. 273—101.2)

1

The object of my invention is to produce a novel amusement device by which an operator may simulate discharge and movement of torpedoes from a submarine vessel toward moving targets, the construction being such that, when skillfully operated, a strike upon the target will be indicated by an appropriate signal.

To this end, the apparatus involves a manually controllable periscope in such form as to create or simulate the "atmosphere" of the firing station of a submarine vessel; a simulation of travel of a submarine torpedo from the firing station toward a target surface vessel; means for simulating an extended water surface between the firing station and a selectable surface target; means coordinated with the periscope and the target whereby the operator may be advised as to whether his manipulation has been such as to hit or miss the selected target; and various other details which will be set forth in the accompanying specification and claims.

The accompanying drawings illustrate an embodiment of my invention.

Fig. 1 is a perspective view of the apparatus;

Fig. 2 is a perspective view of the periscope unit and the means for simulating water surface and torpedo travel;

Fig. 3 is a longitudinal section through the mechanism, taken on the line 3—3 of Fig. 4, and showing the periscope-controlled switching mechanism;

Fig. 4 is a longitudinal section taken on the line 4—4 of Fig. 3;

Fig. 5 is a longitudinal section, on the line 5—5 of Fig. 6, of the water-surface and torpedo travel-simulator upon an enlarged scale;

Fig. 6 is a section on line 6—6 of Fig. 5; and

Figure 7:
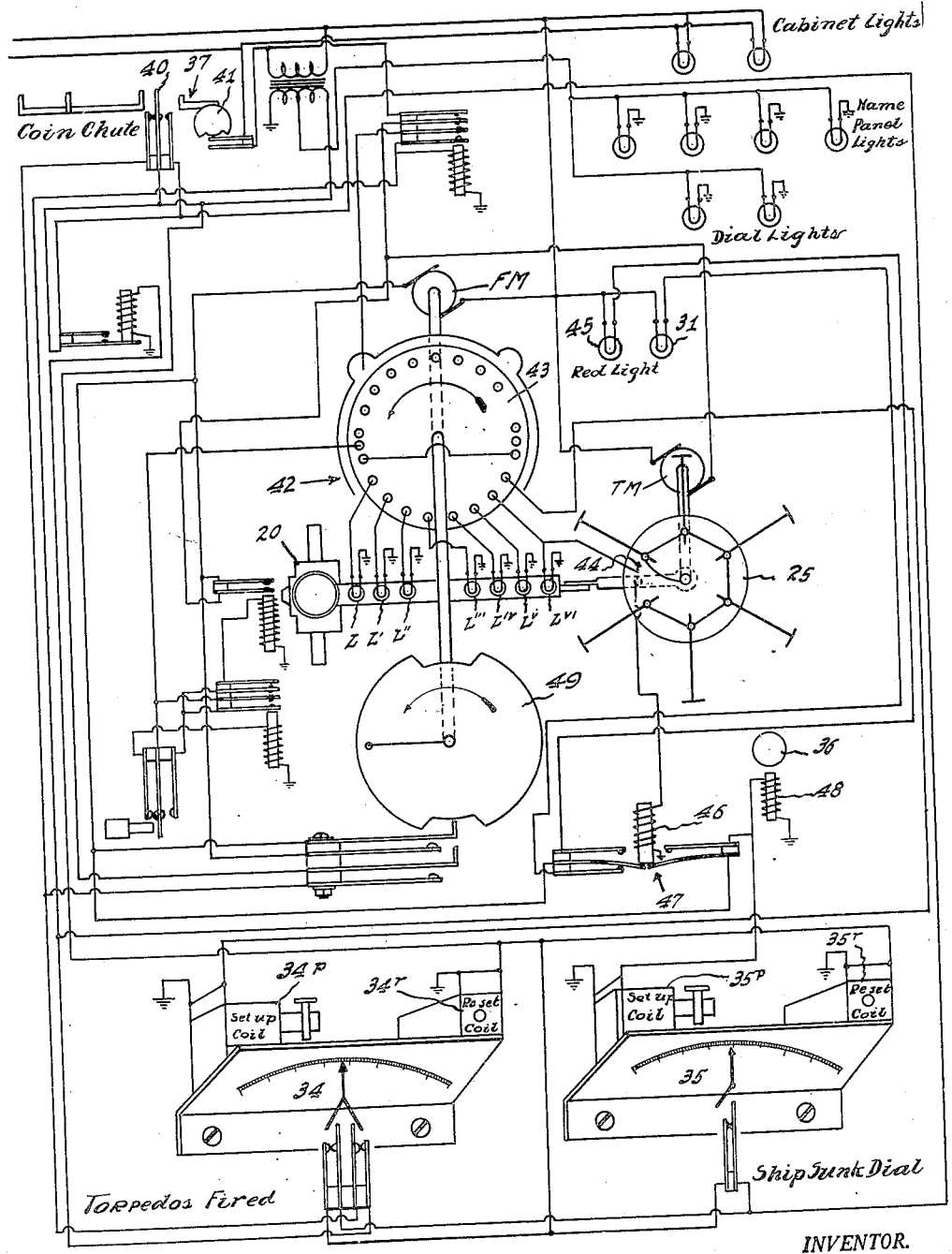
Fig. 7 is a wiring diagram.

In the drawings 10 indicates a housing having a vertical face 11, at average eye height, on which are exposed various dials to designate the number of operations, number of strikes, etc., together with illustrations of mechanisms commonly found adjacent the periscope station of a submarine vessel.

The upper part 10' of housing 10 overhangs face 11 and from it depends a periscope 20 oscillable about a vertical axis with an eye-piece 21 and handles 22, 22 by which the periscope may be oscillated about its vertical axis. At its upper end the periscope comprises a lens 23 directed toward the path of travel of a plurality of targets T, T', T'', etc., simulating surface vessels and carried by a turntable 25 in such manner as to be successively moved into and through

2 the range of lens 23 which lens is preferably of such character as to magnify targets. The several targets are electrically connected to ground through individual terminals t, t', t'', etc., which are carried by turntable 25 in a circular series concentric with the axis of the table. Table 25 is rotated by any suitable means, such as motor TM.

Pivoted on the axis of table 25 is an arm 26 provided with a terminal 27 located in the path of terminals t, t', t'', etc. The arm 26 is supported for swinging movement about said axis in a guide 28 whose ends 128 and 129 constitute limiting stops for the movement of said arm. A spring 130 constantly biases the arm 26 toward said stop 129, while a finger 29 movable with oscillations of the periscope 20 engages said arm 26 to swing the same toward said stop 128 against the tendency of spring 130.

Carried by the periscope 20, subtending and adjacent the line of sight from lens 23, is a sheet of glass 30 the upper surface of which is finely undulant so that, perceived through lens 23 and illuminated by a lamp 31, a water surface will appear to lie between the operator and the targets as they successively come into view.

Beneath glass 30 is a series of lamps L, L', L'', etc., the light from which is directed upon the under surface of glass 30 through a longitudinal slit 32 extending radially from the axis of the periscope, the arrangement being such that, as lamps L, L', L'', etc., are successively lighted and extinguished, the observer will see a spot of light apparently moving along the surface of the glass 30, thus simulating the appearance of the wake of a torpedo passing from the observer toward a target. A push button 33, on the periscope adjacent its handles, is provided for manipulation by the operator.

Indicating mechanisms 34 and 35, for indicating or recording "fires" and "hits," are of well known form, each comprising an indicator actuated step-by-step by a solenoid ratchet-pawl 34p or 35p and released for return to normal position by a solenoid release 34r or 35r. The details of these mechanisms are well known and therefore need no further description as they form no part of my present invention.

The coin controlled mechanism 37 for placing the apparatus in condition for use, may be of any well known form which will establish, and maintain for a predetermined interval, actuating electrical circuits for the entire mechanism. This apparatus comprises a switch 40 and a time cam 41 activated by proper operation of a coin receiver. Details of the mechanism are well known and form no part of my present invention.

The flash mechanism 42 is of well known form, electrically driven by a motor FM, which is energized through a suitable cycling relay when the button 33 is pressed. Said motor drives a rotatable terminal disc 43 which establishes circuits successively through lamps L, L', L'', etc., and which also carries a terminal which, as the cycle nears completion, closes a circuit to energize the "fire" indicator 34.

The circuit of one of the L lamps, preferably the last one, is associated with a circuit including a terminal 44 contacted successively by the t terminals and including a red flash lamp 45 and the coil 46 of a relay 47 which controls the "hit" indicator 35, so that if terminals 27 and 44 are simultaneously in circuit, lamp 45 will illuminate the visible surface of sheet 30 with a red light so as to simulate a torpedo explosion upon a target, and the "hit" indicator will be advanced.

Relay 47 also controls a circuit through coil 48 of the signal device 36 so that signal 36 will be sounded when lamp 45 is flashed.

The flash mechanism preferably includes terminal arrangements, as indicated in Fig. 7, whereby successive flashings of lamps L will occur during time intervals of different lengths thereby simulating the travel of different torpedoes at different speeds from the firing station to the target, and the terminal-controlling cam 49 forms part of this mechanism. The details of such mechanism are well known and form no part of my present invention and therefore require no further description.

Various lights, as indicated in Fig. 7 are provided for illuminating the apparatus during idle and active periods.

The apparatus having been activated by the insertion of a proper coin, the target turn-table is set in motion to bring the targets T successively into the range of vision through the periscope, and lamp 31 is energized to illuminate the targets and the upper surface of glass 30. The operator, looking through the periscope, observes the passage of the targets, apparently at a great distance over water, due to the character of the upper surface of glass 30 and its illumination by lamp 31; and, by swinging the periscope on its vertical axis, the operator follows the visible target.

When button 33 is operated, the flash motor FM is energized and the successive energization of lamps L, L', L'' etc., simulates subsurface passage of a torpedo toward the target and indicator 34 is actuated to record a "fire." If the operator is able to establish a contact between terminal 27 and the appropriate one of terminals t<sup>x</sup> when terminal 44 is in contact with a terminal t<sup>x</sup>, relay 47 and coil 48 are energized and lamp 45 is flashed to indicate and record a "hit."

The target motor TM will be stopped and the lamp 31 will be extinguished at the end of a predetermined advancement of the "shot" recorder, or at the end of a time period determined by the time train, whichever occurs first. The "shot" and "hit" recorders are returned to zero by the actuation of the relays 34r and 35r when another coin is inserted in the machine. Suitable additional lamps are provided to properly illuminate the structure during "idle" and "play" periods.

The requisite electrical circuits are well known and are indicated in Fig. 7 so that detailed description and tracing is believed unnecessary.

I claim as my invention:

1. In an amusement device, a target carrier mounted for rotation about a fixed axis, means for driving said carrier, a plurality of targets mounted on said carrier, an electric terminal associated with each target and partaking of its course of travel, a manually-movable sighting device movable about an axis spaced from said target axis to scan a part of the course of travel of each target, means for simulating a course of travel of a projectile from the sighting device toward the path of travel of the targets, manually controllable means adjacent the sighting device for initiating operation of the projectile simulating means, a movable electric terminal mounted for oscillation about said carrier axis and coordinable with said target terminals, means connecting the sighting device to move said last-mentioned terminal about the carrier axis upon movement of said sighting device about its own axis in an attempt to contact said last-mentioned terminal with a target terminal at a predetermined portion of the cycle of operation of the projectile-simulating means, a hit indicator, and means for actuating said hit indicator, only if and when the aforesaid two terminals are in contact at a predetermined instant of the cycle of operation of the projectile simulator.

2. An amusement device comprising a movable target having an associate electric terminal, a second movable terminal having a path of travel coincident with a portion of the path of travel of the first terminal and contactible with said first terminal, a movable sighting device adapted to scan and follow a portion of the path of travel of the target during which the said two terminals may be in contact, means controlled by movement of said sighting device to determine the point at which said second terminal will contact said target terminal, means for simulating the travel of a projectile toward the target, manual means for initiating the operation of said projectile simulating means, an electrically controlled indicator, and an energizing circuit for said indicator including said two terminals and a portion of the projectile simulating means beyond its initiation control.

3. An amusement device comprising a turntable carrying a target and an associate electric terminal, means for driving said table, a sighting device manually movable to scan and follow a portion of the path of target travel, an arm pivoted on the table axis and carrying an electric terminal contactible with the first-mentioned terminal, a manually movable sighting device arranged to scan and follow the target through a portion of its movement, projectile-simulating means, means associated with the sighting device for moving said arm-carried terminal to effect contact with the target terminal, manual means for initiating movement of the projectile-simulating means, an electrically controlled indicator, and means for energizing said indicator including said two terminals and a part associated with the outer end of the projectile-simulating means and independent of the initiating means of said projectile-simulating means.

4. In an amusement device, an upstanding body capped by a closed section overhanging a vertical portion of said body, a target device within said closed section, and a periscope including a tube penetrating and depending from said overhanging section, said tube being oscillable about its axis and having an eye-piece through which said target may be viewed.

5. In an amusement device, an upstanding body having a substantially vertical panel, means associated with said body and providing an opaque ceiling projecting outwardly beyond said panel, a target device carried above the level of said ceiling and screened from the view of one standing adjacent said body, and a periscope including a tube penetrating said ceiling at a point spaced from said panel, depending from said ceiling, and unsupported at its bottom end, said periscope further including an eye-piece through which said target device may be viewed.

6. In an amusement device, a sighting device through which a laterally-limited field may be viewed, means mounting said sighting device for swinging movement to shift the field thus visible through said sighting device, means within said field and movable with said sighting device and simulating a water surface, and means associated with said water-surface-simulating means and movable therewith for simulating the moving wake of a subsurface projectile.

CARL ELMER LARSON.

REFERENCES CITED

The following references are of record in the file of this patent:

UNITED STATES PATENTS

| Number | Name | Date |
| --- | --- | --- |
| 1,281,720 | Tully | Oct. 15, 1918 |
| 2,216,278 | New | Oct. 1, 1940 |
| 2,269,410 | New | Jan. 6, 1942 |
| 2,275,797 | New | Mar. 10, 1942 |
| 2,300,132 | New | Oct. 27, 1942 |